United States Patent [19]

Schwendener et al.

[11] 4,315,058
[45] Feb. 9, 1982

[54] VENT PLUGS FOR ELECTRIC STORAGE BATTERIES

[75] Inventors: Derek K. Schwendener; Neil L. Ainsworth, both of Billericay; Richard J. Foss, Rainham, all of England

[73] Assignee: Chloride Group Limited, London, England

[21] Appl. No.: 147,319

[22] Filed: May 6, 1980

[30] Foreign Application Priority Data

May 9, 1979 [GB] United Kingdom ............... 16115/79

[51] Int. Cl.³ .............................................. H01M 2/12
[52] U.S. Cl. ...................................... 429/84; 429/87; 429/89
[58] Field of Search ...................... 429/82, 84, 87–89

[56] References Cited

U.S. PATENT DOCUMENTS

| 3,907,605 | 9/1975 | Melone | 429/89 |
| 3,944,437 | 3/1976 | Auerbach | 429/82 |
| 4,002,495 | 1/1977 | Hakarine | 429/87 |
| 4,091,180 | 5/1978 | Fox et al. | 429/84 |

Primary Examiner—Charles F. LeFevour
Attorney, Agent, or Firm—Oblon, Fisher, Spivak, McClelland & Maier

[57] ABSTRACT

A vent plug includes a thermophastic tubular body for insertion in an aperture in the lid of a battery. The vent plug has at its upper end an integral lid with a gas venting aperture formed therein. A removable insert is secured within the tubular body and defines a tortuous gas venting path. The insert and the body are constructed to define a space with which the gas venting aperture and the gas venting path communicate, the space accommodating a porous flame retarding body.

15 Claims, 4 Drawing Figures

VENT PLUGS FOR ELECTRIC STORAGE BATTERIES

BACKGROUND OF THE INVENTION

1. Field of the Invention

The present invention relates to vent plugs of the type which are intended to remove or minimize the risk of an explosion occurring within an electric storage battery.

2. Description of the Prior Art

During the charging and discharging of electric batteries a potentially explosive mixture of gases may be liberated, particularly if the battery is overcharged. In the case of lead acid batteries a stoichiometric mixture of hydrogen and oxygen is liberated. An external spark, static discharge or other high temperature source can start a flame which may pass down inside the battery, and the resultant explosion can rupture the battery casing spraying acid around causing damage and danger.

SUMMARY OF THE INVENTION

According to the present invention a vent plug for an electric storage battery includes a tubular body for insertion in an aperture in the lid of the battery having at its upper end an integral lid and a gas venting aperture which may be formed in the lid or in the upper portion of the tubular body, and a removable insert secured within the tubular body and defining by itself or with the body a gas venting path, the insert and the body being constructed so as to define a space with which the gas venting aperture and the gas venting path communicate, the space accommodating a porous flame retarding body, retained in position by the removable insert. Preferably the venting path is tortuous to cause electrolyte entrained in the gas being vented to coalesce.

In a preferred embodiment the removable insert includes two discs interconnected by a web, and the gas venting path passes through one or more apertures formed in each of the discs.

The invention also embraces a ganged vent plug incorporating two or more such vent plugs, which may be connected by a common carrier so as to be movable relative to each other or which may be formed as a single moulding with their lids integral.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
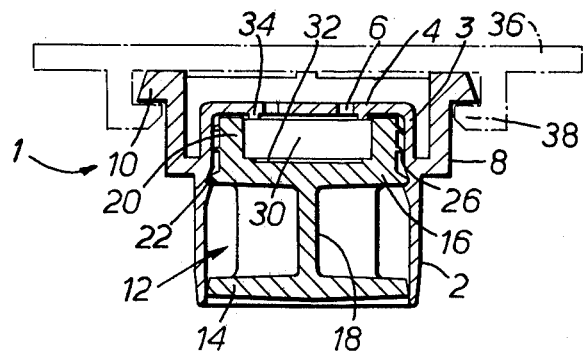
FIG. 1 is a sectional elevation of single vent plug.

The vent plug shown in FIG. 1 includes an injection moulded tubular body 2 of polypropylene whose lower open end is intended to be inserted into a hole in the lid of an electric storage battery. At its upper end 3 the body has an integral lid 4 in which are formed two symmetrically disposed gas venting apertures 6. Integral with the body is an upstanding annular wall 8 with its lower end connected to the outer surface of the body about one third of the way down and spaced outwardly from it and having at its upper edge an outwardly projecting lip 10. The wall 8 and its associated lip 10 are so shaped that in plan view the outer edge of the vent plug is substantially square.

Figure 2:
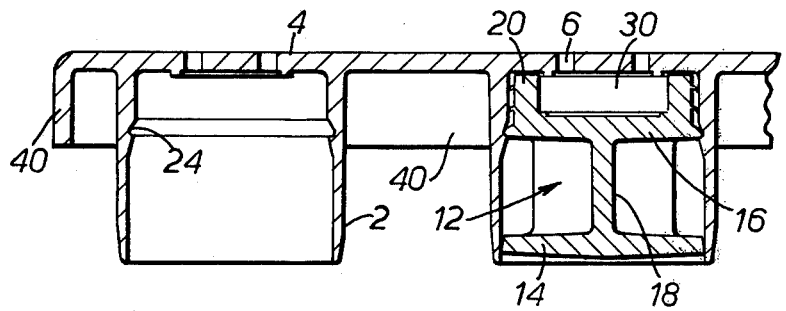
FIG. 2 is a similar view of two or more such vent plugs connected together to form a ganged vent.
Figure 3:
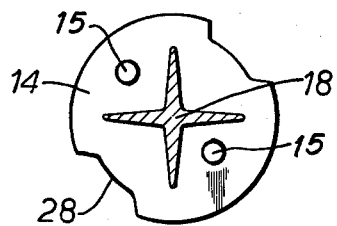
FIG. 3 is a plan sectional view through the retaining plug shown in FIGS. 1 and 2.

Located within the tubular body 2 is a removable insert 12 formed as an integral body of polyethylene and including a lower disc 14 connected to an upper disc 16 by a symmetrically disposed cruciform web 18, whose shape is best seen in FIG. 3. Connected to the upper disc 16 is an upstanding peripheral wall 20 whose upper edge is adjacent the underside of the lid 4 and which together with the lid 4 and the disc 16 defines a disc shaped space. Integral with the disc 16 is a radially extending peripheral flange 22 which engages in a corresponding groove 24 (seen in FIG. 2) formed in the inner wall of the body 2 and secures the insert 12 within the body.

The edge of the disc 14 is slightly spaced from the interior of the body 2 while the edge of the flange 22 is in sealing engagement with the interior of the body 2, and the provision of two integral peripheral sealing lips 26 on the wall 20 ensure that no gas can pass around the edge of the insert. A gas venting path is provided by two diametrically opposed cut-away portions 28 in the lower disc 14, and two holes or gas venting apertures 15 in the upper disc 16. As seen in FIG. 3, the cut-away portions 28 communicate with two of the quadrants defined by the cruciform web 18 and the holes in the disc 16 are positioned to communicate with the other two quadrants.

The space defined by the disc 16, the wall 20 and the lid 4 is occupied by a disc 30 of flame-retardant material, such as sintered polyethylene sold under the Registered Trade Mark VYON, retained in position by the disc 16. Even if the gas passing through the flame-retardant disc does become ignited, the flame does not pass down through it into the battery.

As may be seen the upper disc 16 of the insert carries an annular ledge 32 adjacent the inner side of the wall 20 on which the flame retardant disc rests so that it is spaced from the gas venting apertures in the upper disc by a narrow gap. In addition the lid 4 carries on its underside a circular rib 34 which ensures that the flame retardant disc is also spaced from the apertures 6 by a narrow gap of, for example, 0.5 mm.

Thus, in use, the tubular body 2 is inserted into a hole in the lid of a battery, and gas evolved passes through the cut-out portions 28 in the lower disc 14 of the removable insert and thence around the web 18 and through the gas venting apertures in the upper disc 16. The gas passes slowly through the flame retarding disc 30 and then through the apertures 6 to the atmosphere. If there should be a temporary high rate of evolution of gas within the battery, this will only escape gradually through the flame retarding disc. The escaping gas then disperses, and the reduced flow rate reduces the possibility of the concentration of gas in the vicinity of the battery rising to a level at which an explosion is possible. The gas venting path defined by the retaining plug 12 ensures that the gas will impinge against a number of surfaces thus coalescing droplets of electrolyte entrained in the gas which run down the wall of the body 2 and the cruciform web 18 and then drip back into the battery through the cut-out portions 28.

It will be appreciated that if the battery has only a single cell, a single vent plug will suffice in which case the upstanding wall 8 has no function and may be omitted. However, if the battery has two or more cells, the same number of vent plugs will be required and these can conveniently be connected or ganged together by means of an elongate common carrier 36 (shown in chain dotted lines in FIG. 1) having two spaced longitudinal inwardly directed lips 38, or a plurality of lips arranged in two lines. The carrier 36, or the vent plug, is flexible so that the lips 10 can be snap-engaged with the lips 38 as shown in FIG. 1. The vent plugs are free to slide to a limited extent along the length of the carrier 36 so that, for example, all six vent plugs may be inserted simultaneously into respective holes in the lid of a 12 volt lead acid battery, without the necessity of ensuring that the spacing of the holes is precisely equal to that of the vent plugs, since slight discrepancies can be accommodated by movement of the vent plugs along the carrier.

FIG. 2 shows an alternative embodiment in which two or more vent plugs are integral. The construction is generally similar to that shown in FIG. 1, and similar parts are designated with the same reference numerals. The vent plugs are formed as a single moulding with their lids integral, which therefore present a smooth uninterrupted surface. Integral with the lids and spaced from the vent plugs is a depending skirt 40 which, in use, may engage the lid of the battery or may be spaced from it.

It will be appreciated that in this construction the spacing between the vent plugs is fixed, and the spacing of the holes in the lid of the battery must therefore be exactly right. Experience has shown that for more than three vent plugs this can be a problem, so for a six cell twelve volt lead acid battery two three-gang vent plugs may be used. However, in all other respects the construction and operation of the device is identical to that in FIG. 1.

Figure 4:
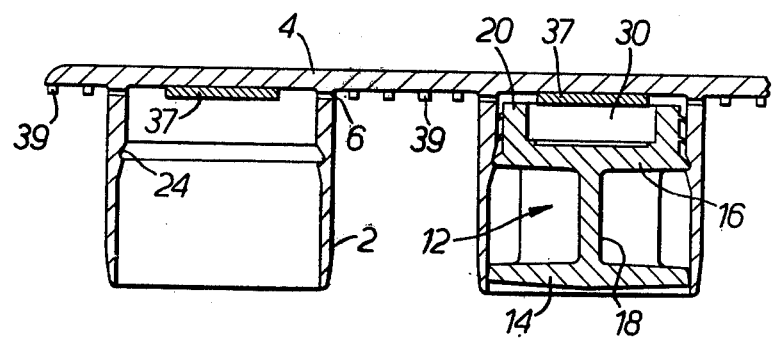
FIG. 4 is a view similar to FIG. 2 of a modified embodiment.

The modified embodiment shown in FIG. 4 is similar to that in FIG. 2. However the skirt 40 has been omitted, the tubular body 2 is somewhat longer, and the groove 24 lower so that there is an appreciable gap between the top of the wall 20 and the underside of the lid 4. Instead of being formed in the lid 4, one or more and in this case two venting apertures 6 are formed at the upper end of the wall of the tubular body 2. The upper face of the flame retarding disc 30 abuts a cruciform shaped projection 37 integral with the underside of the lid 4. This prevents the insert 12 being pushed too far up into the tubular body, and the shape of the projection 37 allows the major part of the surface of the disc to be available for venting. In use, this vent plug may be accommodated in a recess in the battery lid so that the upper surface 4 of the vent plug is flush with the upper surface of the lid. Gas vented from the battery passes through the flame proof body and then the venting apertures 6 in the tubular body and thence around the outer edge of the lid 4 out of the recess in the battery lid to atmosphere. When used in this manner it is possible that the underside of the lid 4 might form a gas tight seal with the floor of the recess in the battery lid. For this reason the underside of the lid 4 is provided with a plurality of small integral projections 39, whose height is approximately equal to the width of the venting apertures 6 to ensure that a venting path is always available between the underside of the vent plug and the recess.

The fact that the insert is removable has the advantage that the identical insert may be used in the two constructions, thus reducing tooling and moulding costs. In addition it is a simple matter to remove the insert to inspect or exchange the flame retarding disc, and the insert may then be reinserted into the tubular body where it is retained by engagement of the flange 22 with the groove 24.

An additional advantage of the provision of the low-porosity flame retarding disc is that if the battery is tipped over it will be some time before electrolyte can permeate through it, so the battery is spill-resistant.

It will be appreciated that many modifications may be made to the constructions described above. For instance, the materials used may be varied and the vent plug may be of screw or bayonet type, the screw thread or bayonet fixture being carried by either the wall 8 or the body 2. In addition either or both of the ledge 32 or the rib 34 may be omitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vent plug for an electric storage battery comprising:
    a tubular body for insertion in an aperture in a lid of said battery;
    said vent plug further comprising an upper end portion integral with said tubular body;
    a lid integrally formed within said upper end portion of said vent plug wherein at least one aperture is formed within said upper end portion for venting gas from said vent plug;
    a removable insert secured within said tubular body and at least partially defining a gas venting path, said insert and said body defining a space with which said at least one gas venting aperture and said gas venting path communicate; and
    a porous flame retarding body disposed within said space, said flame retarding body being retained in position by said removable insert such that said flame retarding body may be readily removed from said vent plug.

2. A vent plug as claimed in claim 1 in which said at least one gas venting aperture is formed in said integrally formed lid.

3. A vent plug as claimed in claim 2 further comprising a projection formed on the underside of said integrally formed lid for spacing said flame retarding body from said at least one gas venting aperture in said lid.

4. A vent plug as claimed in claim 1 in which said at least one gas venting aperture is formed in said tubular body.

5. A vent plug as claimed in claims 1 or 2 or 4 in which said venting path is tortuous so as to cause electrolyte entrained in the gas being vented from said battery to coalesce.

6. A vent plug as claimed in claims 1 or 2 or 4 in which said removable insert comprises an upper disc and a lower disc interconnected by a web, wherein at least one aperture is formed in each said disc, said gas venting path passes through said at least one aperture in each of said discs.

7. A vent plug as claimed in claim 6 in which said web is of cruciform section having edges defining four quadrants within said tubular body, each said at least one aperture in one disc of said removable insert communicating with one of said quadrants with which each at least one aperture in the other said disc is not in direct communication, so that gas being vented from said battery must flow around an edge of said web.

8. A vent plug as claimed in claim 7 wherein said upper disc comprises an upper surface and a projection on said upper surface on which said flame retarding body rests and is spaced from each said at least one venting aperture in said upper disc.

9. A vent plug as claimed in claims 1 or 2 or 4 further comprising an annular wall upstanding from said removable insert partially defining said space within which said flame retarding body is accommodated.

10. A vent plug as claimed in claims 1 or 2 or 4 wherein said flame retarding body comprises a ceramic material.

11. A vent plug as claimed in claims 1 or 2 or 4 in which said flame retarding body comprises sintered polyethylene.

12. A vent plug as claimed in claims 1 or 2 or 4 further comprising:
a peripheral flange formed about an outer portion of said removable insert for securing said removable insert within said tubular body, said tubular body further comprising an inner surface portion defining a groove for engagement with said peripheral flange.

13. A vent plug as claimed in claims 1 or 2 or 4 further comprising a ganged vent plug including at least two vent plugs movable relative to one another.

14. A vent plug as claimed in claim 13 further comprising:
a common carrier for connecting each said at least two vent plugs;
said tubular body further comprising an upstanding wall integrally formed with said tubular body;
said upstanding wall further comprising a lip projecting outwardly; and
said common carrier further comprising a lip formed on the underside of said common carrier for engagement with said lip projecting outwardly from said upstanding wall.

15. A vent plug as claimed in claims 1 or 2 or 4 further comprising a ganged vent plug including at least two vent plugs wherein said lids are integral and form a continuous surface.

* * * * *